(12) United States Patent
Kim

(10) Patent No.: US 8,464,017 B2
(45) Date of Patent: Jun. 11, 2013

(54) APPARATUS AND METHOD FOR PROCESSING DATA IN A MASSIVELY PARALLEL PROCESSOR ARRAY SYSTEM

(75) Inventor: Ju-Hyun Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 223 days.

(21) Appl. No.: 12/985,694

(22) Filed: Jan. 6, 2011

(65) Prior Publication Data

US 2011/0179246 A1 Jul. 21, 2011

(30) Foreign Application Priority Data

Jan. 15, 2010 (KR) ........................ 10-2010-0003935

(51) Int. Cl.
*G06F 12/00* (2006.01)
(52) U.S. Cl.
USPC ............ 711/170; 711/156; 711/202; 711/206
(58) Field of Classification Search
None
See application file for complete search history.

(56) References Cited

U.S. PATENT DOCUMENTS 7,574,582 B2 8/2009 Nolan

*Primary Examiner* — Shawn X Gu
(74) *Attorney, Agent, or Firm* — The Farrell Law Firm, P.C.

(57) ABSTRACT

An apparatus and method for processing data in a Massively Parallel Process Array (MPPA) system are provided, in which a scheduling processor determines an array processor and an initial memory, and requests halt release to the array processor, which requests allocation of an additional memory or return of used memory to an address conversion controller, if allocation of additional memory or return of used memory is needed during program execution. The address conversion controller controls, upon receipt of the request for allocation of additional memory, conversion of a base address of additional memory to a physical address and, upon receipt of the request for return of used memory, deletes registered information from the address conversion table. The array processor requests return of additional memory to the address conversion table and transmits a terminal signal to the scheduling controller, upon completion of the program.

8 Claims, 3 Drawing Sheets

APPARATUS AND METHOD FOR PROCESSING DATA IN A MASSIVELY PARALLEL PROCESSOR ARRAY SYSTEM

PRIORITY

This application claims priority under 35 U.S.C. §119(a) to a Korean Patent Application filed in the Korean Intellectual Property Office on Jan. 15, 2010 and assigned Ser. No. 10-2010-0003935, the contents of which are incorporated herein by reference.

BACKGROUND OF THE INVENTION

1. Field of the Invention

The present invention relates generally to a Massively Parallel Processor Array (MPPA) system and, more particularly, to an apparatus and method for processing data in an MPPA system.

2. Description of the Related Art

An MPPA system is designed to manage a wireless communication modem using hundreds of simple processors integrated on a single chip in communication systems that require a large amount of data storage and complex data processing.

A picoChip is an example of the MPPA system. Each processor on the picoChip operates using a small local memory and the processors are synchronized with one another in a producer-consumer relationship. Specifically, the picoChip allocates only one simple task to each processor. In the picoChip, each next processor waits until a predecessor processor completes a given operation, though the tasks do not change dynamically between the processors. A multi-port switch matrix is installed in the form of a mesh as data bus channels between the processors. Since the switch matrix is fixed to a specific state by selecting a channel to be used between processors in a developmental stage and the processors are mapped to one another in a one-to-one correspondence, a constant time duration is always required for data transfer. As the number of processors increases in the picoChip, a bottleneck may occur at the data bus channels. Therefore, a plurality of data bus channels are installed between processors to achieve a wide bus bandwidth. However, even through the picoChip has a plurality of data bus channels between processors, only one data bus channel is eventually used between them, resulting in routing wire waste.

Another MPPA system is the Cell Broadband Engine (Cell BE) developed jointly by IBM, Sony and Toshiba. The Cell BE system is commercialized as a heterogeneous multiprocessor system. In the Cell BE, one Power Processor Element (PPE) manages all application programs and a plurality of Synergetic Processor Elements (SPEs) specialized in data processing preserve a coherent page table in order to use the same virtual address for all threads created by processors. For protection of system stability and security, the SPEs copy data from a system memory to their local memories. Accordingly, a wide bus bandwidth is required. In addition, the Cell BE needs a complex device to maintain the coherency of virtual addresses and the complex device also requires a wide bus bandwidth.

As described above, an MPPA system such as the picoChip and the Cell BE generally requires a wide bus bandwidth. Accordingly, there exists a need to solve the wide bus bandwidth problem for processing of data in an MPPA system.

SUMMARY OF THE INVENTION

An aspect of embodiments of the present invention is to address at least the problems and/or disadvantages and to provide at least the advantages described below. Accordingly, an aspect of embodiments of the present invention is to provide an apparatus and method for efficiently processing data to overcome the problem of a wide bus bandwidth requirement in an MPPA system.

Another aspect of embodiments of the present invention provides an apparatus and method for processing data via memory switching in an MPPA system.

In accordance with an embodiment of the present invention, a data processing apparatus is provided in a Massively Parallel Process Array (MPPA) system, in which a scheduling processor initiates a process for performing a task, determines an array processor and an initial memory corresponding to the process, requests a halt release to the array processor, and requests returning of the initial memory to an address conversion table, upon receipt of a termination signal from the array processor, the array processor performs a program of the process, determines whether allocation of an additional memory or returning of the used memory is needed, and requests allocation of an additional memory or returning of the used memory to an address conversion controller according to the determination, the address conversion controller controls an address converter to convert a base address of the initial memory or the additional memory to a physical address, upon receipt of a request for the initial memory or allocation of an additional memory from the scheduling processor or the array processor, and deletes registered information about the used memory from the address conversion table, upon receipt of a request for returning the used memory, and a memory pool has at least one memory with a physical address.

In accordance with another embodiment of the present invention, a data processing method is provided in an MPPA system, in which a process for performing a task is initiated, an array processor and an initial memory corresponding to the process are determined, and a halt release is requested to the array processor by a scheduling processor, allocation of an additional memory or returning of a used memory is requested to an address conversion controller by the array processor, if allocation of an additional memory or returning of the used memory is needed during execution of a program, conversion of a base address of the additional memory to a physical address is controlled upon receipt of a request for allocation of an additional memory, and registered information about the used memory is deleted from the address conversion table, upon receipt of a request for returning of the used memory, by the address conversion controller, returning of the additional memory is requested to the address conversion table and a terminal signal is transmitted to the scheduling controller, upon completion of the program by the array processor, and returning of the initial memory is requested to the address conversion table, the process is deleted, and the array processor is halted by the scheduling processor.

BRIEF DESCRIPTION OF THE DRAWINGS

The above and other objects, features and advantages of certain embodiments of the present invention will be more apparent from the following detailed description taken in conjunction with the accompanying drawings, in which.

DETAILED DESCRIPTION OF EMBODIMENTS OF THE INVENTION

Figure 1:
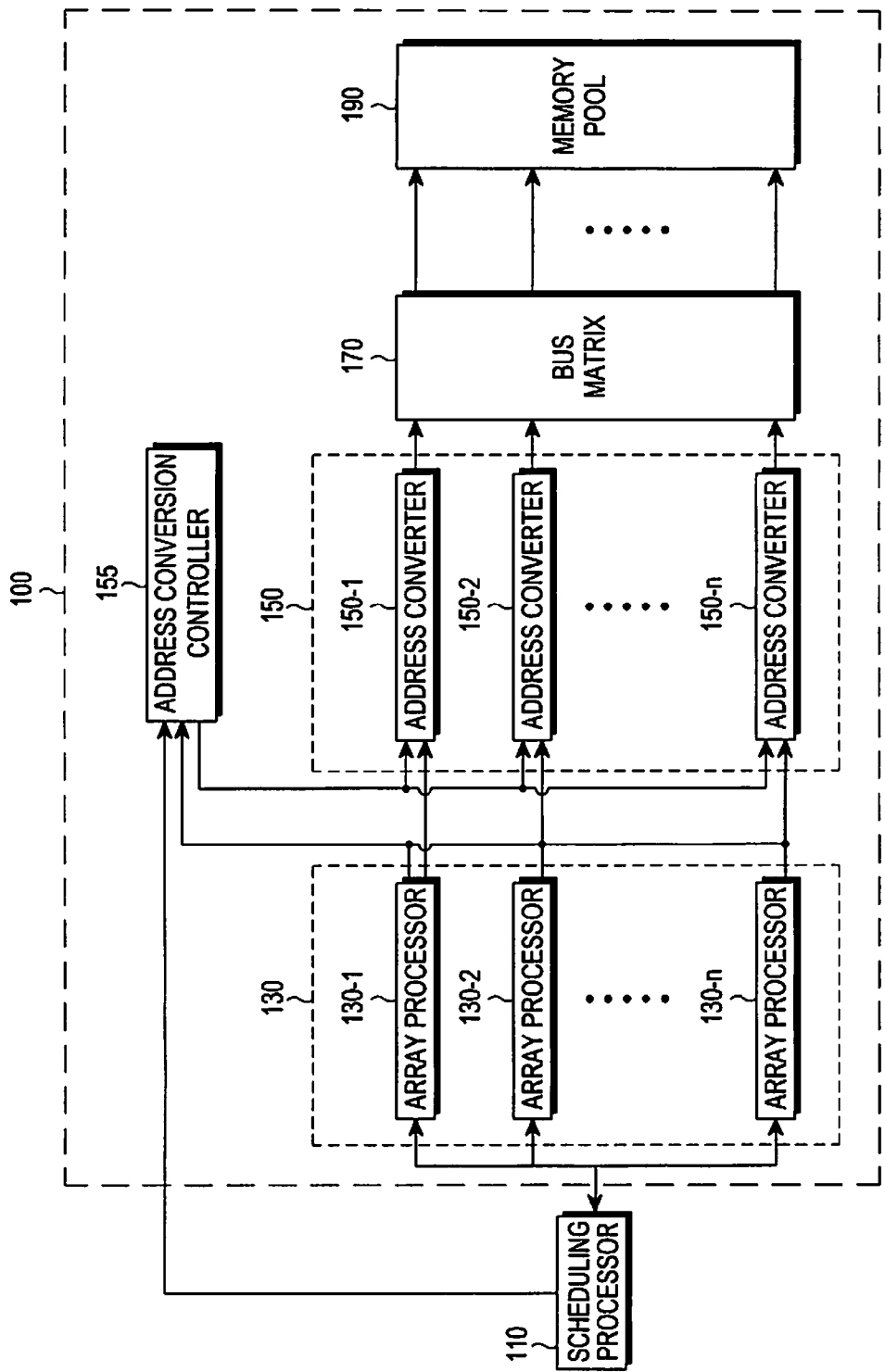
FIG. 1 is a block diagram of a data processing apparatus according to an embodiment of the present invention.

Reference will now be made in detail to the preferred embodiments of the present invention with reference to the accompanying drawings. In the drawings, the same reference numerals are utilized to refer to similar elements, features and structures.

As described above, MPPA systems require a wide bus bandwidth to process data because data transfer often takes place due to a large number of processors in the MPPA system. Herein, the data transfer refers to memory copy, which is needed to transfer data in a structure using local memories to avoid cache coherence problems.

The present invention provides a data processing apparatus and method for switching data to another processor without memory-to-memory transfer in an actual bus by virtually changing a memory address without memory copy for data transfer. The data processing apparatus and method of the present invention obviate the need for installing a large number of data bus channels to achieve a wide bus bandwidth in an MPPA system. In addition, the data processing apparatus and method of the present invention are applicable to applications experiencing frequent memory copy, e.g. a shared memory-based network switch.

FIG. 1 is a block diagram of a data processing apparatus according to an embodiment of the present invention.

Referring to FIG. 1, the data processing apparatus of the present invention includes a scheduling processor 110, an array processor unit 130 including a plurality of array processors 130-1 to 130-$n$, an address conversion unit 150 including a plurality of address converters 150-1 to 150-$n$ mapped in a one-to-one correspondence to the plurality of array processors 130-1 to 130-$n$, an address conversion controller 155 for controlling the address converters 150-1 to 150-$n$, a bus matrix 170, and a memory pool 190.

The scheduling processor 110 is a higher-layer processor that manages an MPPA system 100. Because an entire application is defined as a set of tasks to be performed in the array processor unit 130 in the MPPA system 100, the scheduling processor 110 initiates, which as used herein includes generating, processes for performing each task of a task set. Each process includes information about an array processor, a code memory, and a scratch pad memory as basic resources needed to perform the task. The processes may be stored in a queue.

The scheduling processor 110 identifies one of the generated processes and determines whether an array processor indicated by array processor information that is included in the process and an initial memory indicated by the code memory information and scratch pad memory information included in the process are available. If the array processor and the initial memory are available and the process is initially performed, the scheduling processor 110 allocates the process to the array processor, requests an initial memory allocation to the address conversion controller 155, and then requests a halt release to the array processor.

On the other hand, if the process is not initially performed, the scheduling processor 110 recovers an address conversion table pre-stored in a scratch pad memory of the initial memory and requests the halt release to the array processor. The pre-stored address conversion table is an address conversion table that the scheduling processor 110 has backed up by allocating another process to the array processor during a waiting time when the array processor needs allocation of an additional memory, but when the memory is not yet available during program execution.

Since every writable memory is accessible to only one array processor at a given time, a cache can be used in the memory without a cache coherency problem. However, the cache should be invalidated when memory switching takes place. Upon notification of completion of a program from the array processor unit 130, the scheduling processor 110 performs a scheduling operation involving requesting that the address conversion controller 155 to return the initial memory, deleting the completed process, and halting the operation of the array processor.

The array processor unit 130 includes the plurality of array processors 130-1 to 130-$n$. Each array processor processes a data-intensive process and may include a Digital Signal Processor (DSP). Each array processor operates using a unique memory address space. Herein, a virtual address, i.e. a base address, is used. If the plurality of array processors 130-1 to 130-$n$ operate independently, it is difficult for the scheduling processor 110 to take charge in every memory allocation and every memory return. Therefore, the scheduling processor 110 creates only an initial process and each array processor requests an additional memory allocation or return to the address conversion controller 155 during program execution.

The address conversion controller 155 manages address conversion tables stored in the plurality of address converters 150-1 to 150-$n$ according to a memory allocation/return request from the scheduling processor 110 or the array processor unit 130. Each address conversion table maps an actual memory page in an absolute address, i.e. physical address, space to the virtual address space of an array processor, as illustrated in FIG. 2.

Figure 2:
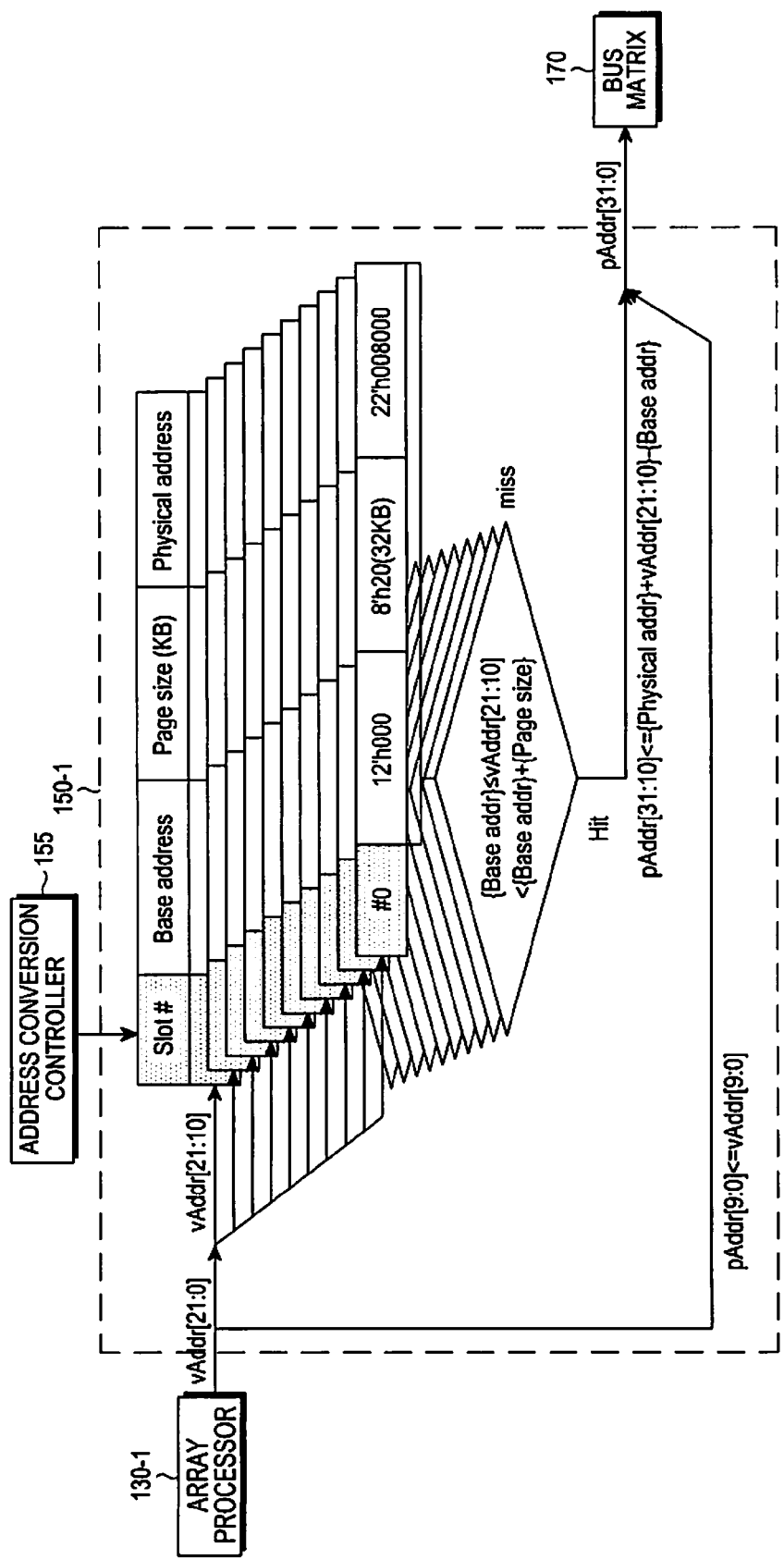
FIG. 2 illustrates a configuration of an address converter of the data processing apparatus illustrated in FIG. 1.

Referring to FIG. 2, the address conversion table includes at least one of a base address, i.e. a Base address field, for determining whether upper ('v') bits are allocated to the current array processor, a Page size field, which supports a variable page size, specifying an actual size of an allocated memory, a Physical address field indicating the physical address of the allocated memory, and a valid bit for controlling the address conversion table. The number of slots in the address conversion table may vary according to a target application and the configuration of the memory pool 190. Each slot has an address matching logic to determine whether the base address matches a physical address according to an algorithm as provided in Table 1.

TABLE 1 if {Base addr} $\leq$ vAddr[(n−1):(n−v)] < {Base addr} + {Page size}
    pAddr[31:(n−v)] <= {Physical addr} + vAddr[(n−1):(n−v)] − {Base addr}
    pAddr[(n−v−1):0] <= vAddr[(n−v−1):0]
endif More specifically, upon receipt of a memory allocation request from the scheduling processor 110 or an array processor, the address conversion controller 155 registers memory information, i.e. Physical address and Page size fields, and the position of the base address, to which the memory is to be allocated in the address conversion table of an address converter mapped to the array processor. For instance, if the virtual address of the array processor 130-1 is n bits long, the address conversion controller 155 determines a physical address for upper v bits to be changed and provides the physical address to the address converter 150-1. The lower (n−v) bits are not changed. In the example provided in FIG. 2, n=22 and v=12.

Upon receipt of a memory return request from the scheduling processor 110 or an array processor, the address conversion controller 155 deletes registered information about a requested memory from an address conversion table. That is, upon request for return of a used memory, the address conversion controller 155 invalidates a related address area from the address conversion table.

In this manner, the address conversion controller 155 performs memory switching by processing a memory allocation/return request received from the scheduling processor 110 or the array processor unit 130.

The address conversion unit 150 converts a virtual address received from the array processor unit 130 to a physical address received from the address conversion controller 155.

The bus matrix 170 processes a bus request corresponding to the physical address converted by the address converter.

The memory pool 190 includes one or more physical memory areas of different sizes, with each memory area having a fixed physical address. The memory pool 190 may have a different configuration depending on the configuration of the plurality of array processors 130-1 to 130-n and applications. That is, only if a wide bandwidth is not required, except for memory copy for data parsing between the plurality of array processors 130-1 to 130-n and fragmentation can be effectively prevented, a bandwidth requirement may be fulfilled by switching using a single memory, e.g. an external SDRAM. However, various types of bus traffic take place simultaneously, due to code fetch, data load/store, cache miss, etc. in addition to data copy. Therefore, the memory 190 is preferably divided to allow simultaneous accesses through a plurality of ports in order to effectively process the bus traffic. The number of ports for accessing the memory pool 190 and the size of a memory page for each port (related to fragmentation) are allocated based on design complexity and cost, with an optimally determination taking into consideration a trade-off relationship of design complexity and cost.

Figure 3:
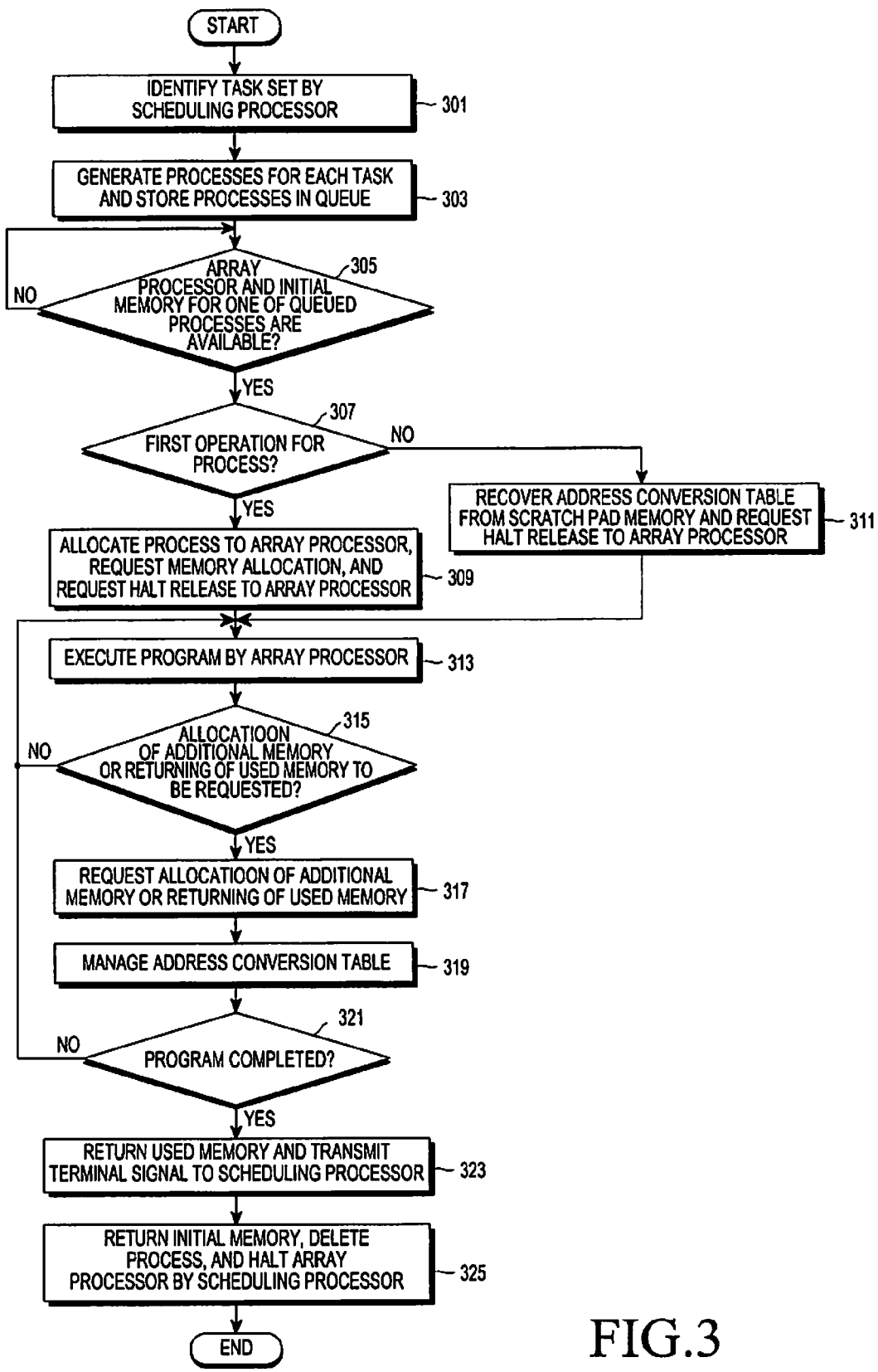
FIG. 3 is a flowchart of a data processing method according to an embodiment of the present invention.

FIG. 3 is a flowchart illustrating a data processing method according to an embodiment of the present invention.

Referring to FIG. 3, in step 301 the scheduling processor 110 identifies a set of tasks to be performed and in step 303 the scheduling processor 110 generates processes for each task, with the processes stored in a queue. In step 305, the scheduling processor 110 checks one of the queued processes and determines availability of an array processor indicated by array processor information included in the process and of an initial memory indicated by code memory information and scratch pad memory information included in the process.

If determined that the array processor and the initial memory are not available, the scheduling processor 110 repeats step 305. If the array processor and the initial memory are determined to be available, in step 307 the scheduling processor 110 determines whether the process is initially performed. If the process is initially performed, in step 309 the scheduling processor 110 allocates the process to the array processor, requests the address conversion controller 155 to allocate a code memory and a scratch pad memory, i.e. the initial memory, and requests the halt release to the array processor. On the other hand, if in step 307 the process is determined not to be initially performed, in step 311 the scheduling processor 110 recovers a pre-stored address conversion table from the scratch pad memory and requests the halt release to the array processor.

Thereafter, in step 313, the array processor executes the program according to the halt release request from the scheduling processor 110. In step 315 he array processor determines whether to request allocation of an additional memory or return of the used memory during the execution of the program. If determined in step 315 to request allocation of an additional memory or to return the used memory, in step 317 the array processor requests allocation of an additional memory or return of the used memory to the address conversion controller. If determined in step 315 not to request allocation of an additional memory or return of the used memory, step 313 is repeated and the array processor continues to execute the program.

In step 319, the address conversion controller 155 manages an address conversion table according to the request for allocation of an additional memory or for returning the used memory. If the additional memory is not available immediately upon request of allocation of the additional memory, the address conversion controller 155 places the array converter in a sleep state, stores the address conversion table in the scratch pad memory to allocate another process to the array processor so that the array processor may perform the allocated process, and provides a sleep signal to the scheduling processor 110. Then the scheduling processor 110 stores the process in the queue, halts the operation of the array processor, and performs an operation for another queued process.

In step 321, the array processor determines whether the program is completed. If the program has is not determined to be complete, the array processor continues to execute the program by returning to step 309. On the other hand, upon determination of completion of the program, the array processor returns the used additional memory by requesting the address conversion controller 155 and transmits a termination signal to the scheduling processor 110 in step 323. The scheduling processor 110 returns the initial memory to the address conversion controller 155, deletes the process from the queue, and halts the operation of the array processor in step 325.

As described above, a program is executed on each array processor in an MPPA system, as if only the array processor exists. The program requests a memory before using the memory and returns the memory after using the memory. In this manner, memory switching can be achieved.

As is apparent from the above description, the present invention can transfer data only through transfer of a virtual memory address without data transfer based on memory copy through a communication channel such as a bus between array processors in an MPPA system. Therefore, a bus bandwidth constraint is relieved and the performance of the MPPA system is increased. In addition, the present invention avoids cache coherency problems without adding complexity of considerations of physical addresses positions since memory is shared through memory switching.

While the invention has been shown and described with reference to certain embodiments of the present invention thereof, it will be understood by those skilled in the art that various changes in form and details may be made therein. Therefore, the scope of the invention should be determined by the appended claims and their legal equivalents, not by the above description, and all changes coming within the meaning and equivalency range of the appended claims are intended to be embraced therein.

What is claimed is:

1. A data processing apparatus in a Massively Parallel Process Array (MPPA) system, the apparatus comprising:
    a scheduling processor for initiating a process for performing a task, determining an array processor and an initial memory corresponding to the process, requesting a halt release to the array processor, and requesting return of the initial memory to an address conversion table, upon receipt of a termination signal from the array processor;
    the array processor for performing a program of the process, determining whether allocation of an additional memory or return of a used memory is needed, and requesting allocation of the additional memory or return of the used memory to an address conversion controller according to the determination of whether allocation of the additional memory or return of the used memory is needed;

the address conversion controller for, upon receipt of a request for the initial memory or allocation of the additional memory from the scheduling processor or the array processor, controlling an address converter to convert a base address of the initial memory or the additional memory to a physical address, and deleting registered information about the used memory from the address conversion table according to the request for return the used memory; and a memory pool having at least one memory with a physical address.

2. The data processing apparatus of claim 1, wherein if the process is initially requested, the scheduling processor allocates the process to the array processor and requests allocation of the initial memory to the address conversion controller, and if the process is not initially requested, the scheduling processor recovers an address conversion table pre-stored in the initial memory.

3. The data processing apparatus of claim 1, wherein the process includes information about the array processor and information about the initial memory, the initial memory information including information about a code memory and information about a scratch pad memory.

4. The data processing apparatus of claim 1, wherein the address conversion table includes at least one of a base address field, a page size field, a physical address field, and a valid bit.

5. A data processing method in a Massively Parallel Process Array (MPPA) system, the method comprising:

initiating a process for performing a task, determining an array processor and an initial memory corresponding to the process, and requesting a halt release to the array processor by a scheduling processor;

requesting allocation of an additional memory or return of a used memory to an address conversion controller by the array processor, if allocation of the additional memory or return of the used memory is needed during execution of a program;

controlling, upon receipt of a request for allocation of the additional memory, conversion of a base address of the additional memory to a physical address, and upon receipt of a request for return of the used memory, deleting registered information about the used memory from an address conversion table by the address conversion controller;

requesting return of the additional memory to the address conversion table and transmitting a terminal signal to the scheduling controller by the array processor, upon completion of the program; and requesting return of the initial memory to the address conversion table and halting the array processor by the scheduling processor.

6. The data processing method of claim 5, wherein the requesting of the halt release to the array processor comprises:

allocating the process to the array processor and requesting allocation of the initial memory to the address conversion controller by the scheduling processor, if the process is initially requested; and recovering an address conversion table pre-stored in the initial memory by the scheduling processor, if the process is not initially requested.

7. The data processing method of claim 5, wherein the process includes information about the array processor and information about the initial memory, the initial memory information including information about a code memory and information about a scratch pad memory.

8. The data processing method of claim 5, wherein the address conversion table includes at least one of a base address field, a page size field, a physical address field, and a valid bit.

* * * * *